United States Patent
Reimann et al.

(10) Patent No.: US 11,445,393 B2
(45) Date of Patent: Sep. 13, 2022

(54) METHOD AND DEVICE FOR ADJUSTING AT LEAST ONE PARAMETER OF A COMMUNICATION SYSTEM

(71) Applicant: VOLKSWAGEN AKTIENGESELLSCHAFT, Wolfsburg (DE)

(72) Inventors: Daniel Reimann, Braunschweig (DE); Roman Alieiev, Stendal (DE)

(73) Assignee: Volkswagen Aktiengesellschaft

( * ) Notice: Subject to any disclaimer, the term of this patent is extended or adjusted under 35 U.S.C. 154(b) by 10 days.

(21) Appl. No.: 17/046,399

(22) PCT Filed: Apr. 5, 2019

(86) PCT No.: PCT/EP2019/058643
§ 371 (c)(1),
(2) Date: Oct. 9, 2020

(87) PCT Pub. No.: WO2019/197288
PCT Pub. Date: Oct. 17, 2019

(65) Prior Publication Data
US 2021/0120440 A1   Apr. 22, 2021

(30) Foreign Application Priority Data
Apr. 10, 2018 (DE) ............. 10 2018 205 351.0

(51) Int. Cl.
*H04W 24/08* (2009.01)
*H04L 27/26* (2006.01)
*H04W 64/00* (2009.01)

(52) U.S. Cl.
CPC ......... *H04W 24/08* (2013.01); *H04L 27/2605* (2013.01); *H04W 64/006* (2013.01)

(58) Field of Classification Search
CPC .................................................. H04W 24/08
See application file for complete search history.

(56) References Cited

U.S. PATENT DOCUMENTS 7,840,220 B1   11/2010   Mitchell
9,136,930 B2   9/2015   Son et al.
(Continued)

FOREIGN PATENT DOCUMENTS

DE   2360654 C1   11/1979
DE   102011010465 A1   6/2013
(Continued)

OTHER PUBLICATIONS

Abou-Zeid et al.; Towards Mobility-Aware Predictive Radio Access: Modeling, Simulation, and Evaluation in LTE Networks; ACM; Sep. 21, 2014; pp. 109-116; New York, New York.
(Continued)

*Primary Examiner* — Kodzovi Acolatse
*Assistant Examiner* — Abdeltif Ajid
(74) *Attorney, Agent, or Firm* — Barnes & Thornburg, LLP

(57) ABSTRACT

A method and to a device for adjusting at least one parameter of a communication system between two subscribers, wherein at least one parameter is changed based on an estimated future channel quality, wherein the device is configured so that at least one current position of a mobile subscriber at a point in time is detected or ascertained and a future position and environment is estimated based on the current position and an environment model, wherein the channel quality for a future point in time is estimated therefrom, wherein at least one parameter of the communication system is set based on the estimation, wherein the communication system performs an OFDM modulation, wherein the at least one parameter is a cyclic prefix of a transmit symbol.

6 Claims, 2 Drawing Sheets

(56) References Cited

U.S. PATENT DOCUMENTS

| | | | |
|---|---|---|---|
| 9,331,827 B2 | 5/2016 | Siomina et al. | |
| 9,806,912 B2 | 10/2017 | Barbu et al. | |
| 9,807,566 B2 | 10/2017 | Alieiev et al. | |
| 10,110,401 B2 | 10/2018 | Barbu et al. | |
| 2007/0002726 A1 | 1/2007 | Zangi | |
| 2009/0122771 A1* | 5/2009 | Cai | H04L 27/2607 375/260 |
| 2014/0329520 A1* | 11/2014 | Militano | G01S 11/06 455/422.1 |
| 2015/0023439 A1* | 1/2015 | Dimou | H04L 27/2605 375/260 |
| 2015/0131749 A1 | 5/2015 | Slomina et al. | |
| 2017/0041760 A1* | 2/2017 | Alieiev | G01S 5/0273 |
| 2017/0127411 A1 | 5/2017 | Miao et al. | |
| 2017/0332383 A1 | 11/2017 | Frenger et al. | |

FOREIGN PATENT DOCUMENTS

| | | |
|---|---|---|
| DE | 102014008347 A1 | 12/2015 |
| DE | 102015107080 B3 | 8/2016 |
| DE | 102015214968 A1 | 2/2017 |
| DE | 112006001728 B4 | 3/2019 |
| EP | 1988731 A1 | 11/2008 |
| WO | 2010050731 A2 | 5/2010 |
| WO | 2014051374 A1 | 4/2014 |
| WO | 2017052489 A1 | 3/2017 |
| WO | 2017107180 A1 | 6/2017 |
| WO | 2017112694 A1 | 6/2017 |
| WO | 2018063590 A1 | 4/2018 |

OTHER PUBLICATIONS

Search Report for International Patent Application No. PCT/EP2019/058643; dated Jun. 25, 2019.

* cited by examiner

METHOD AND DEVICE FOR ADJUSTING AT LEAST ONE PARAMETER OF A COMMUNICATION SYSTEM

PRIORITY CLAIM

This patent application is a U.S. National Phase of International Patent Application No. PCT/EP2019/058643, filed 5 Apr. 2019, which claims priority to German Patent Application No. 10 2018 205 351.0, filed 10 Apr. 2018, the disclosures of which are incorporated herein by reference in their entireties.

SUMMARY

Illustrative embodiments relate to a method and an apparatus for adjusting at least one parameter of a communication system between two subscribers, wherein at least one subscriber is mobile.

BRIEF DESCRIPTION OF THE DRAWINGS

Disclosed embodiments are explained in more detail below with reference to the figures, in which.

DETAILED DESCRIPTION

Figure 1:
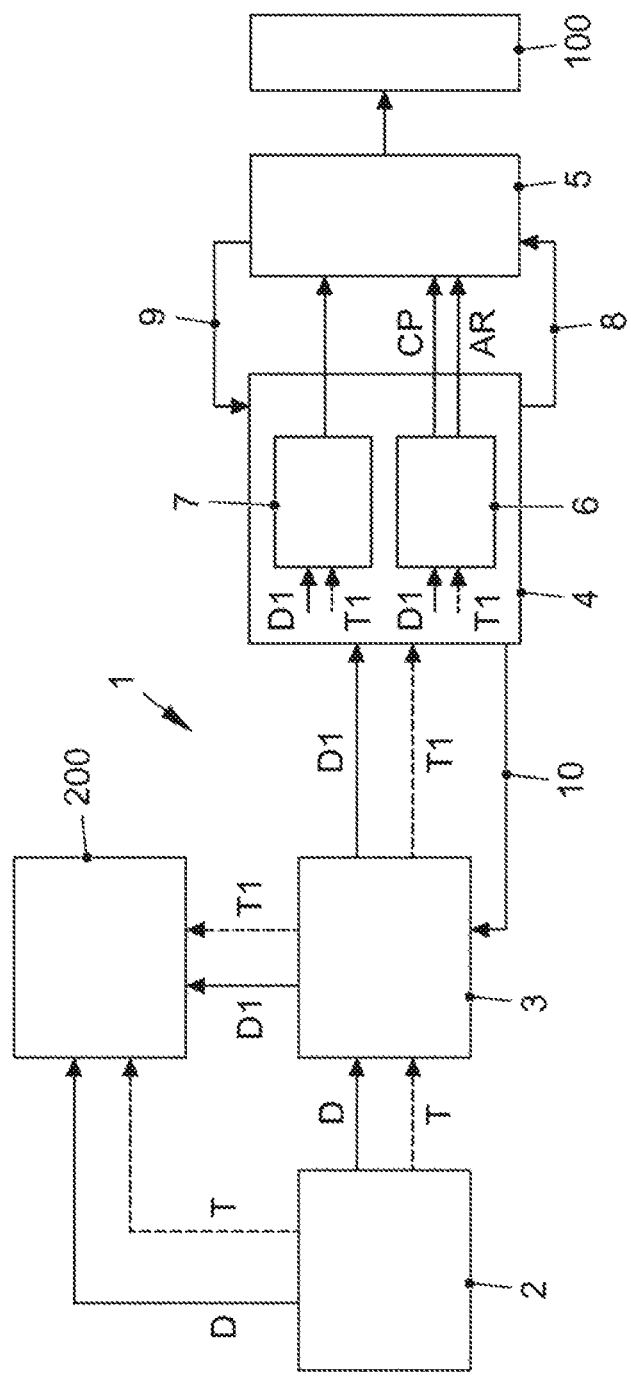
FIG. 1 shows a schematic block diagram of an apparatus for adjusting at least one parameter of a communication system.

DE 10 2015 214 968 A1 discloses a method of the generic type for adjusting at least one parameter of a communication system between two subscribers, wherein at least one subscriber is mobile. In this case, a current position of the mobile subscriber is determined at a time and a channel quality for a future time is estimated on the basis of the current position using an environmental model. In this case, at least one parameter of the communication system is adjusted on the basis of the estimation.

A similar method is known from U.S. Pat. No. 7,840,220 B2 where parameters are adjusted on the basis of the position and statistical channel properties at the position.

For the transmission of messages via an air interface (for example, an LTE (Long Term Evolution) connection), the messages are divided into symbols, for example, before transmission, with the result that each message consists of a plurality of symbols. These symbols are then transmitted with the aid of OFDM (Orthogonal Frequency-Division Multiplexing) modulation. After a symbol has been transmitted, it is necessary to wait for a particular time before a next symbol can be transmitted. The pause is important so that reflections of the radio waves at obstacles do not influence the next radio signal. These pause times are typically implemented by a cyclic prefix (CP). In this case, an end of the symbol is prefixed to the actual symbol. The length of the cyclic prefix is adjustable in this case. If there are transmission errors, the length of the CP can be increased, for example.

The disclosed embodiments are based on the technical problem of further improving a method for adjusting at least one parameter of a communication system between two subscribers and providing an apparatus which is suitable for this purpose.

The technical problem is solved by the disclosed method and the disclosed apparatus.

The method for adjusting at least one parameter of a communication system between two subscribers, wherein at least one subscriber is mobile, comprises the method operations in which a current position of the mobile subscriber is determined at a time and a future position and environment are estimated on the basis of the current position using an environmental model, wherein a channel quality is estimated therefrom. At least one parameter of the communication system is adjusted on the basis of the estimation of the channel quality, wherein the communication system uses OFDM modulation, wherein the at least one parameter is a cyclic prefix of a transmission symbol. This makes it possible to significantly increase the efficiency when transmitting data.

In this case, the channel quality is estimated on the basis of an estimated K factor, wherein, in the case of an estimated K factor of greater than a threshold value, wherein the threshold value is greater than 1, the length of the cyclic prefix is set to a minimum. The threshold value may be $\geq 3$. Very large K factors mean low reflection components, that is to say the cyclic prefix is scarcely necessary or is not necessary at all, with the result that the bandwidth can be fully used for the symbols. The K factor indicates the ratio between the direct power between the subscribers and the power received via reflections.

In at least one exemplary embodiment, a sampling rate of the modulation is additionally adjusted, which further improves the transmission properties.

In a further exemplary embodiment, in the case of a K factor within a range around 1, the length of the cyclic prefix is set to a maximum of a delay of a reflection component if only one or more previously known reflection components are estimated. The range is, for example, $0.5 < K < 1.5$. In this case, the reflections are of the order of magnitude of the direct power (Line of Sight, LOS). However, since they are previously known or marked from the estimation, the transmission quality can be improved by lengthening the cyclic prefix CP.

FIG. 1 illustrates a block diagram of an apparatus 1 for adjusting at least one parameter of a communication system 100. The apparatus 1 comprises an environment capture device 2, an environmental model 3 for estimating a future environment, a unit 4 for estimating parameters of a channel and a unit 5 for adjusting the parameters of the channel which are then forwarded to the communication system 100. The environment capture device 2 comprises a multiplicity of sensor systems, for example, cameras, radar sensors, lidar sensors, ultrasonic sensors, which are used to determine objects and their properties, in particular, their reflection behavior. The environment capture device 2 also has a method or mechanism for determining the position (for example, a GPS receiver). All of these captured data D are transferred, together with a tolerance T, to the environmental model 3. The tolerance T indicates how reliable the determined data are. These data D and their tolerances T can also be transmitted to other systems 200, for example, systems for automated driving. Furthermore, the environmental model 3 also receives the speed and a movement vector of the subscriber (for example, of a transportation vehicle in which the apparatus 1 is arranged). These can be directly transmitted to the environmental model 3 or the environment capture device 2 transmits them. Furthermore, the environmental model 3 can receive the position and movement vector of a further subscriber with which communication is carried out. In this case, it should be noted that the environment capture device 2 can also possibly capture movement vectors of objects (for example, the intended route of a transportation vehicle, which is transmitted via Car2X data).

The environmental model now uses all of these data, with the aid of digital road maps or similar data, to determine what the environment will be like at a future time, wherein the future time is in the seconds range, for example, 1 to 5 seconds. These data D1 and their tolerances T1 are then transmitted to the unit 4 for estimating parameters of a channel. At the same time, these data D1 and tolerances can also be transmitted to the other system 200.

The unit 4 comprises at least one module 6 for determining the length of a cyclic prefix CP. In addition, the unit 4 may also have one or more modules 7 for determining further parameters of the communication system 100. The module 6 then determines a length of a cyclic prefix CP and a sampling rate AR, which appear to be most suitable for the future time, and transmits them to the unit 5. Accordingly, the module 7 delivers parameters to the unit 5 which then adjusts these parameters for the communication system 100. In this case, provision may be made for a further connection 8 to additionally exist from the unit 4 to the unit 5, via which further information is transmitted. Alternatively or additionally, a connection 9 may optionally also exist from unit 5 back to the unit 4 to exchange information. Feedback 10 from the unit 4 to the environmental model 3 may also be provided.

Figure 2:
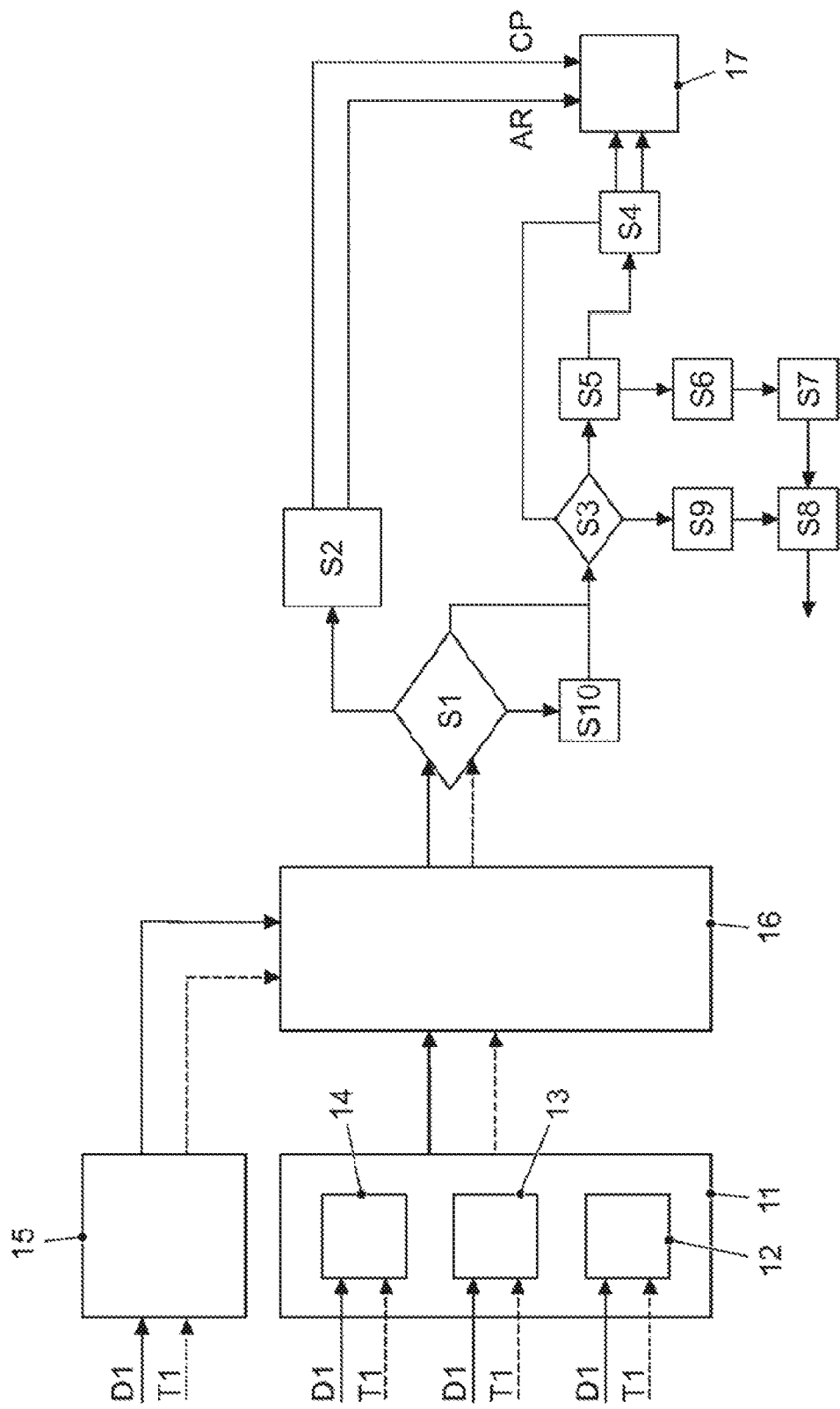
FIG. 2 shows a schematic block diagram of a unit for estimating a cyclic prefix and a sampling rate.

The method of operation of the module 6 is now explained in more detail on the basis of FIG. 2. The module 6 comprises a unit 11 having three submodules 12-14, and a unit 15 for determining a scenario. The module 6 also comprises a unit 16 for estimating a K factor.

On the basis of the estimated K factor and the tolerance of the estimation, a length of the cyclic prefix CP is then determined and a sampling rate AR is stipulated, in which case this is illustrated as a flowchart. This will also be explained in more detail later. The method of operation of the units 11, 15 and 16 shall first of all be described in more detail, however. The data D1 and the tolerance T1 are respectively supplied to the three submodules 12-14 and to the unit 15. In this case, the direct power LOS between the subscribers is estimated in the submodule 12, that is to say how much power is received without reflections. In contrast, the reflected power RP is estimated in the submodule 13. Finally, the submodule 14 estimates how great the delay of the reflected signals is. The determined values and their tolerances are then transmitted to the unit 16. The unit 15 additionally estimates a future scenario, for example, whether the subscriber (for example, the transportation vehicle) is in dense city traffic or is on a free highway. This is also transmitted to the unit 16 with a tolerance, wherein the tolerances are each illustrated using dashed lines. The unit 16 can then estimate a K factor for the respective transmission or reception cycles taking the tolerances into account.

The text below now explains how the length of the cyclic prefix CP is adjusted on the basis of the estimated K factor. This is explained on the basis of selected values for the K factor. Operation at S1 first of all queries whether the K factor is >>1, that is to say greater than a threshold value of 5 or 10, for example. If this is the case, this means that the reflections are negligible. However, a cyclic prefix CP is not necessary in this case, with the result that the length of the cyclic prefix CP can be set to a minimum (to 0 in the extreme case) in a operation at S2 and can be transferred to an output unit 17 together with an appropriate sampling rate AR.

If, in contrast, the query in S1 reveals that the K factor is 1, that is to say is in a range around 1 (for example, 0.5<K factor<1.5), a case distinction should be carried out in a operation at S3. If there is only one dominant reflection component in a transmission interval, the reception quality can be improved by lengthening the cyclic prefix CP and the transmitted symbol can be reliably detected. For this purpose, the length of the cyclic prefix CP is lengthened to the maximum delay of the dominant reflection component in a operation at S4. If, in contrast, a plurality of reflection components are expected, an operation at S5 queries whether these reflection components are classified as resolvable or distinguishable. If this is the case, the length of the cyclic prefix CP can again be adjusted to the maximum delay of the reflection components. Otherwise, these are marked as distinguishable or resolvable in operation at S6 and a sampling rate required for this purpose is estimated in a operation at S7 and is then transferred to the unit 5 in a operation at S8. A further possibility is that, although the K factor is ≈1, no reflections are expected in a specific interval. Such an interval is indicated as a "free interval" in a operation at S9 and is forwarded to the unit 5 in a operation at S8. In cases in which the K factor is <<1, the power of the reflection components therefore dominates. These cases can be handled like k≈1 with a plurality of components, wherein a flag indicating that no direct power LOS (Line of Sight) can be expected is additionally set. It goes without saying that the length of the cyclic prefix CP can be accordingly reduced in the case of intermediate values between K=1 and K>>1.

It should also be noted that the units or modules 11-16 are not necessarily assigned only to the module 6. Rather, it is also possible for them to be upstream separate units, the data from which are transmitted both to the module 6 and to the module 7.

The invention claimed is:

1. A method for adjusting at least one parameter of a communication system between two subscribers,
wherein at least one subscriber is mobile and is a transportation vehicle, the method comprising:
determining a current position of the mobile subscriber at a time;
estimating a future position and environment based on the current position, captured objects and their properties and a speed and movement vector of the subscriber at that time using digital road maps and an environmental model,
wherein a future time is in a seconds range,
wherein a channel quality for the future time is estimated therefrom;
adjusting at least one parameter of the communication system based on the estimation,
wherein the communication system uses OFDM modulation, wherein the at least one parameter is a cyclic prefix of a transmission symbol; and
estimating the channel quality based on an estimated K factor,
wherein the K factor indicates a ratio between direct power between the subscribers and power received via reflections,
wherein, in response to a K factor being within a range around 1, a length of the cyclic prefix is set to a maximum of a delay of a reflection component provided only one or more previously known reflection components are being estimated.

2. The method of claim 1, wherein a sampling rate is additionally adjusted as a parameter.

3. The method of claim 1, wherein, in response to an estimated K factor of greater than a threshold value, wherein the threshold value is great than 1, the length of the cyclic prefix is set to a minimum.

4. An apparatus for adjusting at least one parameter of a communication system between two subscribers, wherein one subscriber is a mobile transportation vehicle, wherein at least one parameter is changed based on an estimated future the channel quality, wherein the apparatus is designed such that at least a current position of the transportation vehicle is captured or determined at a time and a future position and environment are estimated based on the current position, captured objects and their properties and a speed and movement vector of the subscriber at that time using digital road maps and an environmental model, wherein the future time is in a seconds range, wherein the channel quality for a future time is estimated therefrom, wherein at least one parameter of the communication system is adjusted based on the estimation, wherein the communication system carries out OFDM modulation, wherein the at least one parameter is a cyclic prefix of a transmission symbol, wherein the channel quality is estimated based on an estimated K factor, wherein the K factor indicates the ratio between direct power between the subscribers and power received via reflection, wherein, in response to a K factor being within a range around 1, a length of the cyclic prefix is set to a maximum of a delay of a reflection component provided only one or more previously known reflection components are being estimated.

5. The apparatus of claim 4, wherein a sampling rate is additionally adjusted as a parameter.

6. The apparatus of claim 4, wherein, in response to an estimated K factor being greater than a threshold value, wherein the threshold value is great than 1, the length of the cyclic prefix is set to a minimum.

* * * * *